United States Patent
Bothe et al.

(10) Patent No.: US 7,488,272 B2
(45) Date of Patent: Feb. 10, 2009

(54) METHOD FOR THE ACTUATION OF AT LEAST TWO CLUTCHES TRANSMITTING TORQUE IN PARALLEL IN THE DRIVE TRAIN OF A MOTOR VEHICLE AND TRANSMISSION CONTROL UNIT

(75) Inventors: Edgar Bothe, Peine (DE); Andreas Schwenger, Wolfsburg (DE); Wolfgang Schreiber, Isenbüttel (DE)

(73) Assignee: Volkswagen AG, Wolfsburg (DE)

(*) Notice: Subject to any disclaimer, the term of this patent is extended or adjusted under 35 U.S.C. 154(b) by 193 days.

(21) Appl. No.: 11/505,701

(22) Filed: Aug. 17, 2006

(65) Prior Publication Data
US 2007/0191186 A1 Aug. 16, 2007

Related U.S. Application Data

(63) Continuation of application No. PCT/EP2005/001554, filed on Feb. 16, 2005.

(30) Foreign Application Priority Data
Feb. 17, 2004 (DE) .................. 10 2004 007 840

(51) Int. Cl.
*B60W 10/02* (2006.01)
*B60W 10/04* (2006.01)

(52) U.S. Cl. .................... 477/175; 477/180

(58) Field of Classification Search ............ 477/174, 477/175, 180, 181
See application file for complete search history.

(56) References Cited

U.S. PATENT DOCUMENTS

| 4,721,002 A | 1/1988 | Horii |
| 7,044,280 B2 * | 5/2006 | Budal et al. ............ 192/48.9 |
| 2005/0272559 A1 * | 12/2005 | Bothe et al. ............ 477/181 |

FOREIGN PATENT DOCUMENTS

| DE | 35 43 498 A1 | 11/1986 |
| DE | 199 39 334 A | 3/2001 |
| DE | 100 15 296 A1 | 8/2001 |
| DE | 101 38 998 A1 | 3/2003 |
| DE | 101 56 940 A1 | 5/2003 |
| DE | 102 18 186 A1 | 11/2003 |
| DE | 102 32 832 A1 | 2/2004 |
| EP | 1 0720 820 A2 | 1/2001 |
| WO | WO 03/074312 A2 | 9/2003 |
| WO | WO 03/740908 A2 | 9/2003 |

* cited by examiner

*Primary Examiner*—Tisha D Lewis

(57) ABSTRACT

A method actuates two clutches which transmit torque in parallel in a drive train of a motor vehicle and have different successive fixed speed transmissions as gear stages between a drive shaft and an output shaft. The clutches are triggered during acceleration processes of the motor vehicle that both clutches simultaneously transmit torques and a resulting transmission of torque takes place continuously between the drive shaft and the output shaft. The rotational speed of the drive shaft is greater than the respective rotational speed of the respective transmission input shaft of the respective partial train at the secondary end of the respective clutch during the entire starting process, or the rotational speed of the drive shaft is greater than or the same as the respective rotational speed of the respective transmission input shaft of the respective partial train at the secondary end of the respective clutch during an acceleration process.

29 Claims, 2 Drawing Sheets

METHOD FOR THE ACTUATION OF AT LEAST TWO CLUTCHES TRANSMITTING TORQUE IN PARALLEL IN THE DRIVE TRAIN OF A MOTOR VEHICLE AND TRANSMISSION CONTROL UNIT

CROSS-REFERENCE TO RELATED APPLICATIONS

This is a continuing application, under 35 U.S.C. §120, of copending international application No. PCT/EP2005/001554, filed Feb. 16, 2005, which designated the United States; this application also claims the priority, under 35 U.S.C. §119, of German patent application No. 10 2004 007 840.8, filed Feb. 17, 2004; the prior applications are herewith incorporated by reference in their entirety.

BACKGROUND OF THE INVENTION

Field of the Invention

The invention relates to a method for the actuation of two clutches transmitting torque in parallel in the drive train of a motor vehicle and having in each case different following fixed rotational speed ratios as gear steps between a drive shaft and an output shaft. The invention further relates to a transmission control unit for actuating the two clutches transmitting torque in parallel in the drive train of a motor vehicle.

In automatic transmissions according to the prior art, the actual transmission is preceded by a hydrodynamic torque converter. In contrast to the clutch, in the converter, both the rotational speed and the torque are converted. The torque conversion ratio $\mu$ is in this case predetermined permanently by the blade geometry, cannot be varied and is a function of the rotational speed ratio $v=\omega 1/\omega 2$. The following transmission unit, for example configured in the form of an epicyclic transmission or a countershaft transmission with synchronizing units, has the possibility of selecting and setting between different transmission steps. In the case of multi-step automatic transmissions free of traction interruption, for example in the classic automatic multi-step unit, in normal driving the frictional connection is made via one or more actively activated clutches/brakes in the drive train, which are either closed as early as at the commencement of starting or else are closed in a very short time thereafter, what is known as standby control. Both the torque ratio and the rotational speed ratio are predetermined permanently by the closed clutches/brakes. In general, the clutches/brakes in the transmission are in the slip-free state during a start and, outside the gear changes, during travel. The torque ratio of the drive train is dependent on the current rotational speeds and on the configuration of the converter.

In more recent transmission developments, the converter is, in part, dispensed with. In this case, the torque ratio is fixed permanently by the transmission ratio and cannot be varied.

Furthermore, friction clutch transmissions with a plurality of part transmissions are known for example see published, non-prosecuted German patent application DE 35 43 498 A1. In this case, with the aid of a plurality of clutches, part transmissions are combined into transmission ratio steps or gear steps.

Published, non-prosecuted German patent application DE 199 39 334 A1, for example, proposes the adaptation of the engine rotational speed to the clutch rotational speed before the engagement of a clutch of a double clutch transmission.

Specialists discuss activating two clutches disposed in parallel in the power flow in an automatic multi-step transmission only for a short time, but also, only during the gear step change, for periods of time of less than 200 milliseconds. The aim in this case is to change the rotational speed ratio in as short a time as possible. This also entails a corresponding brief change in torque ratio which leads in the case of a constant input torque to an undesirable output torque change. Under unfavorable circumstances, this may lead to considerable torque jumps and therefore also to losses of comfort on account of the very high step-ups in the "lower gears". Furthermore, in the case of high drive torques and low coefficients of friction of the road, a "spinning" of the wheels or a slipping of the wheels may occur at the driving wheels of the motor vehicles. In particular, unfavorable road surfaces and also climatic conditions may intensify the spinning of the wheels or the slipping of the wheels, as already mentioned above.

SUMMARY OF THE INVENTION

It is accordingly an object of the invention to provide a method for the actuation of at least two clutches transmitting torque in parallel in the drive train of a motor vehicle and a transmission control unit that overcome the above-mentioned disadvantages of the prior art methods and devices of this general type, with which driving comfort is improved, in particular the probability of the spinning of the driving wheels or the slipping of the driving wheels of the motor vehicle, preferably during an acceleration operation, such as, for example, the starting operation, is reduced noticeably for the driver of a motor vehicle.

With the foregoing and other objects in view there is provided, in accordance with the invention, a method for actuating at least two clutches transmitting torque in parallel in a drive train of a motor vehicle and having in each case different following fixed rotational speed ratios as gear steps between a drive shaft and an output shaft. The method includes during an acceleration operation of the motor vehicle, activating the clutches to transfer torques simultaneously and a resulting torque ratio between the drive shaft and the output shaft being implemented continuously. If the acceleration operation is a starting operation where the motor vehicle accelerates from a standstill, a first rotational speed of the drive shaft is set higher during the entire acceleration operation than a respective second rotational speed of a respective transmission input shaft of a respective part drive train on a secondary side of a respective clutch of the two clutches. If the acceleration operation starts while the motor vehicle is in motion, the first rotational speed of the drive shaft is set to be higher than or equal to the respective second rotational speed of the respective transmission input shaft of the respective part drive train on the secondary side of the respective clutch.

In accordance with added modes of the invention, the starting operation is performed with a constant engine torque, and a period of time provided for applying the method is at least 300 ms. The activation of each of the two clutches is performed with an aid of a control unit. Ideally the activation of each of the two clutches is done using a characteristic curve, and the characteristic curves are calculated taking into account current driving parameters.

In accordance with a further mode of the invention, a common control of the engine torque and of the resulting torque ratio is performed with an aid of the control unit. Preferably, the resulting torque ratio between the drive shaft and the output shaft lies between a torque ratio of a first part drive train of the drive train and a torque ratio of a second part drive train of the drive train.

In accordance with an additional mode of the invention, a specific first gear step in a first part drive train of the drive train is selected; and a specific second gear step in a second part drive train of the drive train is selected. An activation of the clutches is coordinated such that the clutches transfer the torques simultaneously, and the resulting torque ratio between the drive shaft and the output shaft is implemented continuously. Preferably, the resulting torque ratio is set to correspond to a resulting rotational speed ratio between the drive shaft and the output shaft which can be set via the activation of the clutches with an aid of a control unit, taking into account current driving parameters. The resulting torque ratio can be used to assist in avoiding undesirable wheel slip.

Furthermore, the object is in this case achieved, in the transmission control unit, in that the transmission control unit has a device for activating the two clutches in such a way that the two clutches simultaneously transfer torques not only for the purpose of the gear step change, but also for various driving situations predetermined by the driver and/or detected by a sensor assembly, and therefore a resulting torque ratio between the drive shaft and the output shaft is continuously implemented. Even without the direct intention of a gear change, operation of the clutches in parallel is thus implemented, in order, according to the set object, for the driver to arrive at driving results which correspond to his wishes. The parallel operation of the clutches without the execution of a gear change can thus deliberately be larger than time spans of 200 milliseconds, i.e. 300 milliseconds, in acceleration phases, and well above this, without restriction to starting operations.

A basic idea of the present invention is to provide preferably a continuously settable torque ratio which preferably lies between the torque ratios of two transmission ratio steps, to be precise two selected gear steps. With the aid of simultaneous actuation of two clutches transmitting torque in parallel in the drive train of a motor vehicle and having in each case different following fixed rotational speed ratios, a variable torque ratio can be set continuously. According to the invention, this makes it possible preferably to set the torque ratio explicitly by measures of control functions. The torques can be varied on the output side without a variation in the input torque, that is to say initially without a variation in the engine torque, and, in particular, this may take place by the dynamics of the actuators. This may take place, in particular, during an acceleration operation or the starting operation of the motor vehicle. A further basic idea of the invention is, therefore, during the starting operation of the motor vehicle, to use the clutch capacity of the respective clutch as a manipulated variable for regulating the rotational speed at the drive shaft and/or for regulating the output torque in the control loop provided, preferably to apportion the resulting overall torque to be transferred to the two respective clutches and regulate it such that an optimal acceleration and starting operation is ensured.

There are, then, various possibilities for configuring and developing the method according to the invention and the transmission control unit according to the invention in an advantageous way.

With the foregoing and other objects in view there is further provided, in accordance with the invention, a method for actuating at least two clutches transmitting torque in parallel in a drive train of a motor vehicle and having in each case different following fixed rotational speed ratios as gear steps between a drive shaft and an output shaft. The method includes using a clutch capacity of the respective clutch as a manipulated variable in a control circuit for regulating a first rotational speed of the drive shaft and/or for regulating a output torque during an acceleration operation of the motor vehicle from a standstill condition.

In accordance with another mode of the invention, a varying wheel torque is determined at at least one wheel of the motor vehicle using a sensor assembly in a case of a constant first rotational speed of the drive shaft or of the engine and in a case of a signal from the sensor assembly representing a constant accelerator pedal position. The wheel torque is then adapted to specific external boundary conditions by changing the output torque.

In accordance with another feature of the invention, spinning of the driven wheels of the motor vehicle is detected by comparing wheel rotational speeds of the driven wheels with wheel rotational speeds of nondriven wheels determined using an acceleration sensor; and/or comparing a respective wheel rotational speed determined from the acceleration sensor with a reference rotational speed. In the event of a spinning wheel, the output torque is reduced and also consequently a wheel torque of the spinning wheel until slip of the spinning wheel is reduced.

In accordance with a concomitant feature of the invention, for reducing the slip of the spinning wheel, the two clutches are set such that a displacement of the torque to be transferred to the respective clutch of a part drive train with a selected higher gear step takes place.

Other features which are considered as characteristic for the invention are set forth in the appended claims.

Although the invention is illustrated and described herein as embodied in a method for the actuation of at least two clutches transmitting torque in parallel in the drive train of a motor vehicle and a transmission control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
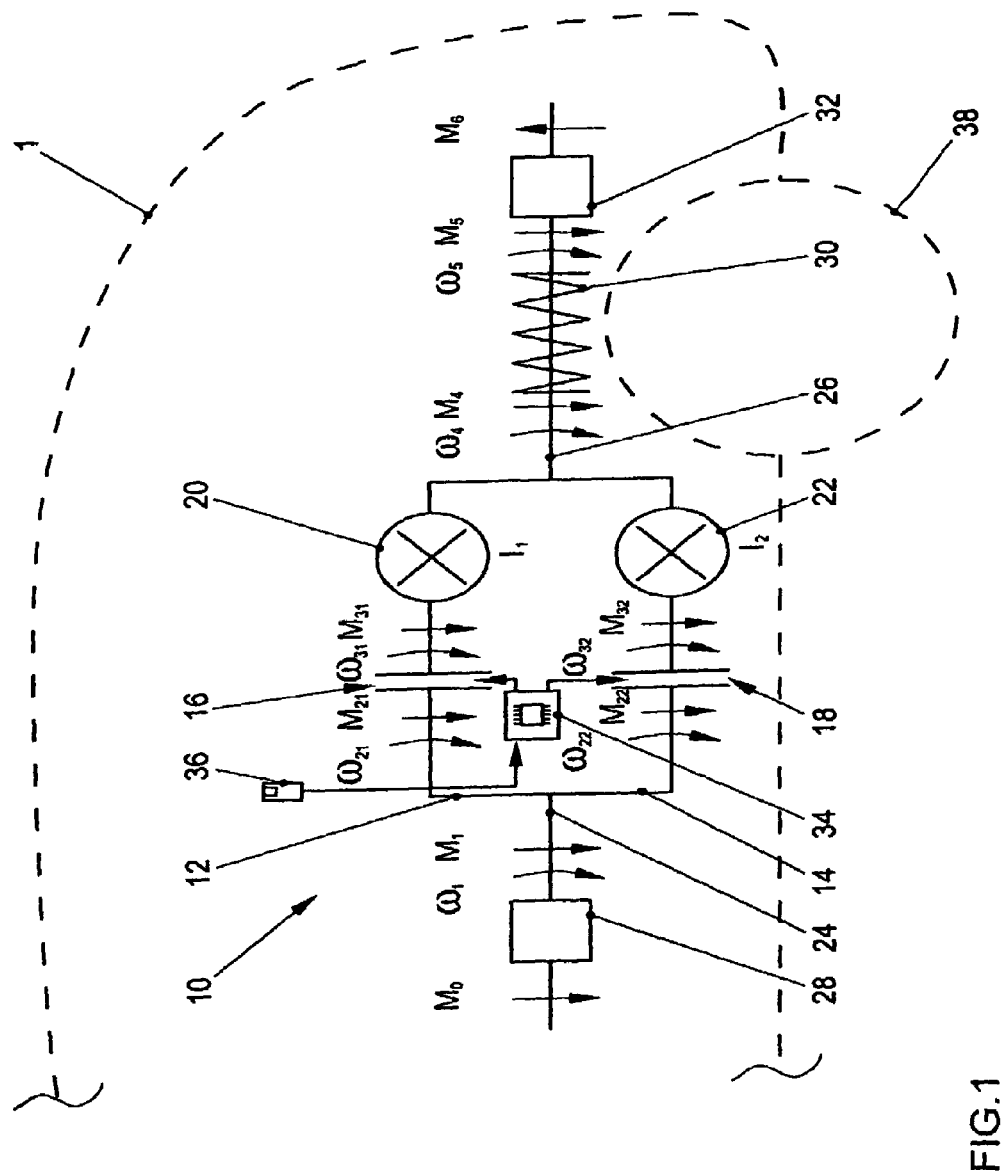
FIG. 1 is an illustration of an equivalent circuit diagram of a drive train of a motor vehicle with a double clutch transmission controlled according to the invention.

Referring now to the figures of the drawing in detail and first, particularly, to FIG. 1 thereof, there is shown a diagrammatic illustration, to be precise a diagrammatic equivalent circuit diagram, of a drive train 10, controlled according to the invention, with a double clutch transmission for a motor vehicle 1 indicated merely in outline in an end region.

FIG. 1 shows the drive train 10 for applying the method for the simultaneous actuation of two clutches 16, 18 transmitting torque in parallel part drive trains 12, 14 in the drive train 10 of the motor vehicle and having in each case different following fixed rotational speed ratios I1 and I2, with gear steps 20 and 22, selected in the part drive trains 12, 14, between a drive shaft 24 and an output shaft 26. Furthermore, in the drive train 10, an engine 28, a rigidity 30 of the drive train 10 and an output 32 are illustrated. The latter leads, in a front-axle, rear-axle or all-wheel drive concept, to at least one wheel 38 of the motor vehicle 1 which, for the sake of clarity, is illustrated in this view alone without the remaining wheels of the vehicle. The picture illustrated in FIG. 1 preferably shows a functioning double clutch transmission substantially diagrammatically.

Straight arrows, which identify a torque M in the respective position, are depicted along the drive train 10 in the two part drive trains 12, 14 at the start, at the end and in each case between two elements. Furthermore, in each between two elements, curved arrows are depicted which identify a rotational speed ω in the respective position. In particular, relevant parameters are symbolized as follows:

M0 the engine torque,
M1 the torque of the drive shaft 24,
M21 the torque between the drive shaft 24 and the clutch 16 of the first part drive train 12,
M22 the torque between the drive shaft 24 and the clutch 18 of the second part drive train 14,
M31 the torque between the clutch 16 and the rotational speed ratio I1 or the selected gear stage 20 of the first part drive train 12,
M32 the torque between the clutch 18 and the rotational speed ratio I2 or the selected gear step 22 of the second part drive train 14,
M4 the torque at the output shaft 26,
M5 the torque at the output shaft 26 after taking into account the rigidity 30 of the drive train 10,
M6 the output torque,
ω1 the rotational speed at the drive shaft 24,
ω21 the rotational speed between the drive shaft 24 and the clutch 16 of the first part drive train 12,
ω22 the rotational speed between the drive shaft 24 and the clutch 18 of the second part drive train 14,
ω31 the rotational speed between the clutch 16 and the rotational speed ratio I1 or the selected gear step 20 of the first part drive train 12,
ω32 the rotational speed between the clutch 18 and the rotational speed ratio I2 or the selected gear step 22 of the second part drive train 14,
ω4 the rotational speed at the output shaft 26, and
ω5 the rotational speed at the output shaft 26 after taking into account the rigidity 30 of the drive train 10.

If more than one clutch, to be precise preferably, in the case of a double clutch transmission, two clutches 16 and 18, are in parallel in the power path of the drive train 10, this may be reproduced by the equivalent circuit diagram illustrated in FIG. 1. The torque Ml influencing the engine rotational speed gradient is composed as follows:

$$M1 = M21 + M22$$

The output torque is defined as follows by the ratios I1 and I2:

$$M4 = M31\,I1 + M32\,I2.$$

The capacity conditions:

$$M31 = M21 \text{ and } M32 = M22$$

apply to the clutches in slip.

If a capacity distribution factor K is introduced, which indicates the percentage in which the torque M1 is composed of the capacities M21 and M22, the following is obtained:

$$M1 = (1-K)M1 + K\,M1 \text{ with } 0 \leq K \leq 1.$$

The output torque M4 is then obtained, as a function of K, as $$M4 = (1-K)M1\,I1 + KM1\,I2.$$

This results in the possibility of a continuous setting of the output torque M4 within the limits:

$$M4\_\min(|K=1) = M1\,I2 < M4 < M1\,I1 = M4\_\max(|K=0)$$
$$\text{for } I1 > I2$$

The hypothetical torque ratio I_T of the overall transmission is obtained as $$I\_T(K) = M4/M1 = (1-K)I1 + KI2.$$

The inverse describes the capacity distribution factor K as a function of the desired torque ratio i_T:

$$K(I\_T) = (I1 - I\_T)/(I1 - I2).$$

The rotational speed ratio I_n of the transmission with slipping clutches is defined as follows:

$$I\_n = \omega1/\omega4.$$

The actual rotational speed ratio can be tracked by regulating the shaft rotational speed with the aid of the actual clutch torque M1.

A control unit 34 is likewise illustrated diagrammatically here, which has corresponding electronic and/or electrical components, in particular a microprocessor. The control unit 34 is supplied via appropriate control/signal lines with all corresponding driving parameters, necessary for determining the various values, by a sensor assembly 36, likewise illustrated only diagrammatically (this may include, for example, wheel rotational speed sensors, accelerator pedal position sensors, driving speed meters, acceleration sensors, inclination sensors and many others), the control unit 34 then correspondingly determining the corresponding values to be determined by it and correspondingly activating the clutches 16 and 18, that is to say the, in particular, hydraulically activatable actuators of these clutches, so that the corresponding pressure forces can be implemented within the clutch 16 and 18, in particular, a mutually coordinated activation of the clutches 16 and 18, preferably a respectively coordinated individual slip control of each clutch 16 or 18, can take place.

Some specific applications will now be described in more detail.

First, one of the basic ideas of the invention is that, during specific acceleration operations and, in particular, during the starting operation of the motor vehicle, the clutches 16, 18 are activated in such a way that the two clutches 16, 18 transfer torques simultaneously and a resulting torque ratio is implemented continuously between the drive shaft 24 and the output shaft 26. In this case, during the entire starting operation, the rotational speed ω1 of the drive shaft 24 is higher than the respective rotational speed ω31 or ω32 of the respective transmission input shaft of the respective part drive train 12 or 14 on the secondary side of the respective clutch 16, 18. During an acceleration operation in higher gear steps, the rotational speed ω1 of the drive shaft 24 is higher than or equal to the respective rotational speed ω31 or ω32 of the respective transmission input shaft of the respective part drive train 12 or 14 on the secondary side of the respective clutch 16, 18. An optimal starting or acceleration operation of a motor vehicle can thereby be implemented, in particular, the resulting torque ratio can be implemented continuously between the drive shaft 24 and the output shaft 26, thus correspondingly increasing the driving comfort.

The term "starting operation" is preferably understood to mean acceleration of the standing or rolling motor vehicle (that is to say, a driving speed v≦10 km/h). During the "starting operation" therefore, the rotational speeds ω31 and ω32 of the respective transmission input shaft are lower than the rotational speed ω1 of the drive shaft 24. The starting operation is preferably concluded when the transfer of the torque takes place only via one of the two clutches 16 and 18 and the slip in this clutch 16 or 18 is substantially reduced. However, what are also considered as acceleration operations are, for example, those driving situations in which a driver, for example after leaving a built-up area, would like to increase the driving speed from 50 km/h to 80 km/h to 100 km/h which is customary on a highway.

A further basic idea of the invention is therefore essentially also that, during the acceleration operation and, in particular, during the starting operation of the motor vehicle, the clutch capacity of the respective clutch 16 or 18 is used as a manipulated variable for regulating the rotational speed ω1 at the drive shaft 24 and/or for regulating the output torque M4 in the control circuit provided. This basic principle therefore goes toward making it possible to regulate, on the one hand, the engine rotational speed and, on the other hand, also the output torque, using the clutch capacities as manipulated variable, without this necessarily entailing a change in the other variable in each case.

An overall clutch capacity is calculated with the aid of a closed-loop control. This may take place, for example, by a follow-up control of the engine rotational speed. The output torque can then be converted to a capacity distribution of the clutches by a desired torque ratio i_T according to the above formulae. It is consequently possible both to adjust an engine rotational speed and to set the output torque highly dynamically within certain limits.

It is therefore possible, on the one hand, that for a predetermined time span, the amount of which is obtained either as a function of a signal from the sensor assembly 36 and/or from a characteristic map stored in the control unit 34, the starting operation takes place essentially with the output torque M4 being maintained, to be precise the rotational speed ω1 of the drive shaft 24 or of the engine 28 is regulated, without a change in the output torque M4 taking place. The other case, already mentioned above, is that the starting operation takes place at least for a predetermined time span essentially with the rotational speed ω1 of the drive shaft 24 or of the engine 28 being maintained, to be precise the output torque M4 is regulated, without a change in the rotational speed ω1 of the drive shaft 24 or of the engine 28 taking place.

The factor i_T may in this case serve as a measure of the comfort or of the sportiness. The higher i_T is selected, the more directly the engine torque changes act on the output torque. The lower the factor i_T is, the more comfortable load changes become.

If the coefficient of friction between tire and road is not sufficient for the current output torque of the wheels, high undesirable slip values occur. So that this state can be counteracted quickly, a reduction in the torque ratio is proposed. This measure is advantageously more beneficial in terms of the dynamic requirements expected by the driver than an engine torque reduction due to the lowering of the degree of delivery of the fuel/air mixture (for example, by the adjustment of the throttle valve in conventional gasoline engines) and is also better than the adjustment of the ignition timing which, as a rule, is accompanied by an increased pollutant formation.

Via a corresponding sensor assembly or a corresponding control circuit, then, with a constant rotational speed ω1 of the drive shaft 24 or of the engine 28 and with a constant accelerator pedal position, a varying wheel torque can be determined at least one wheel 38 of the motor vehicle, preferably via corresponding rotational speed sensors, so that this wheel torque can then be adapted to a specific external boundary condition by the change in the output torque M4. It is therefore possible, as a result of this, to vary the wheel torque correspondingly in order to adapt it to the external boundary conditions, for example to the following specific boundary conditions: to the road gradient, to a possible head wind or for setting a defined speed of the motor vehicle. Preferably, therefore, the motor vehicle can be operated with a constant engine rotational speed, but with varying wheel torques at the wheels, that is to say preferably with a constant accelerator pedal position and a constant engine rotational speed (this may also mean that the accelerator pedal is relieved and the engine is idling).

It is also conceivable that spinning driven wheels of the motor vehicle are determined by the comparison of the wheel rotational speeds of the driven wheels with the wheel rotational speeds of the nondriven wheels or else, for example, by the comparison of the wheel rotational speeds with a reference rotational speed determined from an acceleration sensor. In the case of a spinning wheel determined by the sensor assembly 36, at the insistence of the control unit 34, the output torque M4 and then consequently also the wheel torque of the spinning wheel are reduced by actions on the clutches 16 and/or 18 until the slip of the spinning wheel is reduced. To reduce the slip of the spinning wheel, the two clutches 16 and 18 are set in such a way that a displacement of the torque to be transferred to the respective clutch 16 or 18 of the part train 12 or 14 with a selected higher gear step takes place. In this case, the engine torque does not have to be varied. The limit for this method is when a spinning of wheel cannot be prevented even during a start via the higher gear of those involved. In this case, a higher gear can then be selected at the relieved clutch.

When a start is executed, there can be a very rapid changeover between extremely comfortable accelerations, that is to say with a selection of I_T near 12 with I1>I2, or very sporty accelerations, that is with a selection of I_T near 11 with I1>I2. The change may take place continuously or discretely very quickly. It is also possible, however, to execute the start with a constant I_T.

In a multivariable control circuit, the torque ratio I_T or the capacity distributor factor K may be used as an additional control variable. Thus, for example, it is conceivable to set, at the same time, the engine rotational speed n_Mot (preferably =ω1), the sportiness as a function of I_T and the output torque M4 by the manipulated variables, engine torque M1, and, by the clutch capacities. This control circuit leads to closed drive train management.

If the torque ratio I_T is tracked such that at a synchronous rotational speed of a gear step the corresponding clutch no longer transfers torque, the next gear step on this part transmission can be selected at this time point. Subsequently, the capacity of the then active clutch can then be transferred continuously again to the new clutch and consequently the new gear step. This leads to continuous rotational speed and torque profiles in spite of discrete gear steps.

Further advantageous embodiments of the invention are based on the two clutches 16 and 18 simultaneously transferring torques and a resulting torque ratio being implemented or applied continuously between the drive shaft 24 and the output shaft 26. In the combination of this method with the preferred embodiment of the transmission as a double clutch transmission, the first part drive train 12 has a first transmission input shaft and the second part drive train 14 has a second transmission input shaft. The primary sides of the two clutches 16 and 18 are in each case connected to the drive shaft 24, preferably the engine shaft. The two clutches 16 and 18 of a double clutch transmission are then followed on the secondary side in each case by the first and the second transmission input shaft, preferably the first transmission input shaft being assigned the first, third, fifth and preferably seventh gear and the second transmission input shaft being assigned the second, fourth and sixth gear.

In principle, in the drive train 10, illustrated diagrammatically in FIG. 1, of a double clutch transmission, that is to say in the first part drive train 12, a specific-first-gear step is selected and, in the second part drive train 14, a specific-second-gear step is selected. Since, preferably, here, the first, third, fifth and preferably also seventh gear of a double clutch transmission can be selected within the first part drive train 12, preferably the second, fourth and sixth gear of a double clutch transmission being selectable in the second part drive train 14 of the double clutch transmission, therefore, the "first gear step" mentioned here is basically preferably the first, third or fifth gear of the double clutch transmission. The "second gear step" may basically be the second, fourth or sixth gear of the double clutch transmission. Different combinations are possible here. The designation "first gear step" or "second gear step" is intended to illustrate that different gear steps are meant. A specific resulting torque ratio between the drive shaft 24 and the output shaft 26 is therefore to be achieved as a function of the respective application. Preferably, however, during starts of the motor vehicle, in the respective part drive trains 12 and 14, the first gear is correspondingly selected as the first gear step in the first part drive train 12 and the second gear as the second gear step in the second part drive train 14, so that the method according to the invention can be implemented correspondingly. Thus, the two clutches 16 and 18 assigned to the part drive trains 12 and 14 are activated correspondingly, preferably slip-controlled correspondingly with the aid of the control unit 34, in order to implement the intended resulting torque ratio.

Preferably, the activation of each of the two clutches takes place via a characteristic curve. Each characteristic curve is advantageously calculated, taking into account current driving parameters, with the aid of the control unit 34. Preferably, a common control of an engine torque and of the resulting torque ratio may also take place.

Advantageously, during the activation according to the invention of the clutches 16 and 18, the resulting torque ratio between the drive shaft 24 and the output shaft 26 lies preferably permanently between the torque ratios of the specific gear steps currently selected in the respective part drive trains 12,14.

The method therefore also contains the method steps:

a) selection of a specific first gear step in the first part drive train 12 of the transmission;

b) selection of a specific second gear step in a second part drive train 14 of the transmission; and c) coordinated activation of the clutches 16,18 in such a way that the two clutches 16,18 simultaneously transfer torques and a resulting torque ratio between the drive shaft 24 and the output shaft 26 is continuously implemented.

Preferably, therefore, the resulting torque ratio between the drive shaft 24 and the output shaft 26 can be set by the activation of the clutches.

An advantageous application of the method is the avoidance of undesirable wheel slip, as has already been explained above.

A transmission control unit for carrying out the method has a device for activating the two clutches 16, 18 in such a way that the two clutches 16, 18, in particular, transfer torques simultaneously and the resulting torque ratio between the drive shaft 24 and the output shaft 26 is applied or implemented continuously. In a further embodiment, there is provision for the drive torque, that is to say the engine torque, to be capable of being set. This leads, particularly in the lower gear steps, for example during starting, to an additional considerable increase in comfort. In principle, however, it is appropriate, in the method, that the rotational speed of the engine shaft is always higher than or equal to the rotational speeds of the respective transmission input shafts of the two part drive trains 12 and 14.

Another advantage is that the output torque and therefore the torque at wheels, that is to say the wheel torques, can be varied by the stipulation of the torque ratio via the capacity distribution of the active clutches 16 and 18 by the dynamics of the actuators of the clutch activation zone. This influencing of the wheel torques is substantially quicker than action on the engine torque and can therefore be employed in order to avoid undesirable wheel slips.

Furthermore, the method may also be employed correspondingly in the case of more than two parallel part drive trains. Preferably, however, the method outlined is suitable for a double clutch transmission.

Figure 2A:
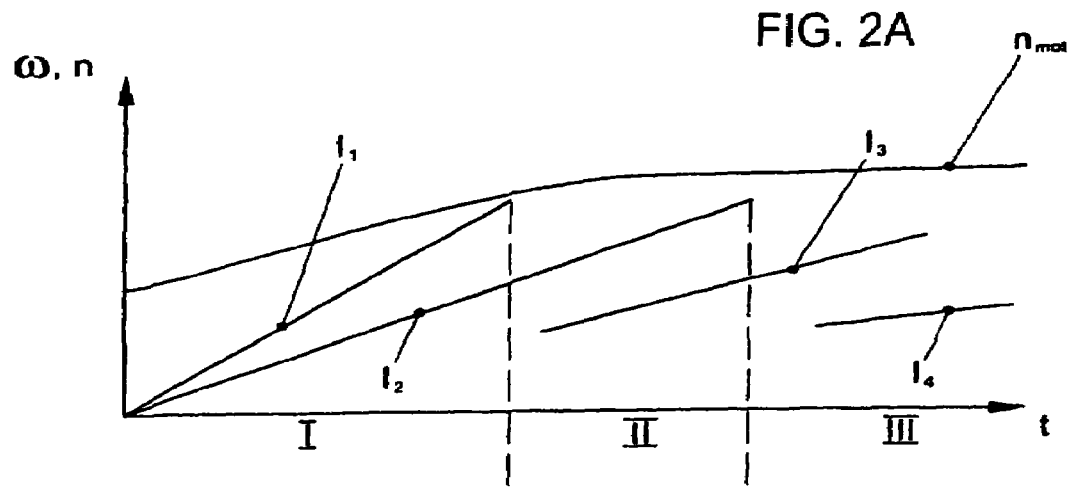
FIG. 2A is a graph plotting rotational speeds against time t for specific rotational speed ratios I1 to I4.
Figure 2B:
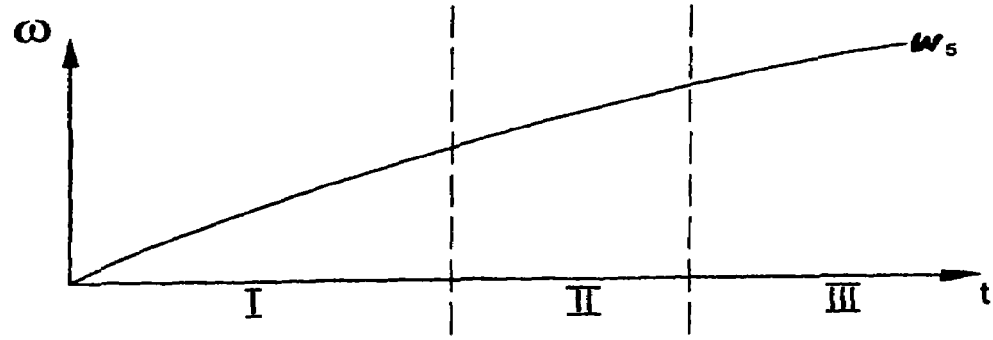
FIG. 2B is a graph plotting the rotational speed at an output shaft against the time t.
Figure 2C:
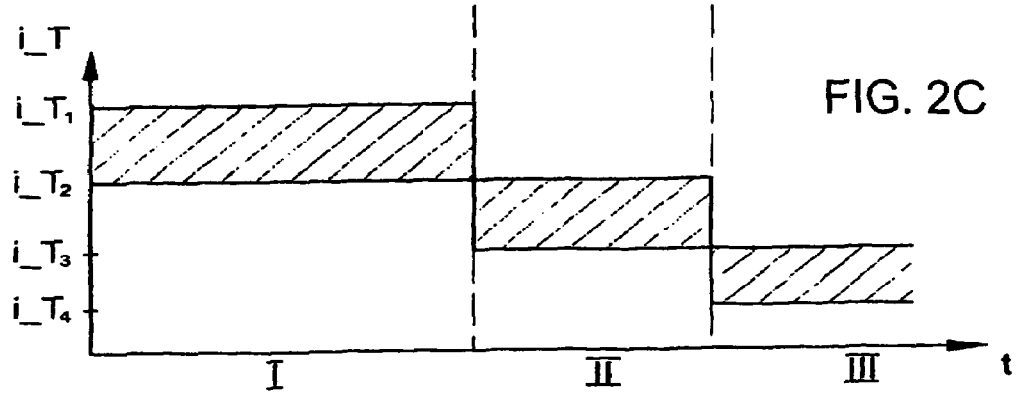
FIG. 2C is a graph plotting the control of a torque ratio of the overall transmission against the time t according to the invention.

FIGS. 2A to 2C show different regions 1, 11 and III and rotational speeds ω existing under specific conditions for these regions and, in FIG. 2C, the resulting torque ratio I_T. The following details in relation to FIGS. 2A to 2C are now described.

FIG. 2A shows a diagrammatic illustration of the corresponding rotational speeds against the time t, to be precise the engine rotational speed n_mot and the rotational speeds ω31 of the first transmission input shaft of the double clutch transmission and the rotational speed ω32 of the second transmission input shaft of the double clutch transmission, in the case of differently selected first four gears, to be precise in the case of the correspondingly selected four gear steps with the ratios I1, I2, I3 and I4 illustrated here.

FIG. 2B shows the output rotational speed ω5 of the output shaft 26 likewise for the various regions I, II and III.

Finally, FIG. 2C shows corresponding "hatched regions" for the respective regions I, II and III. It can be seen clearly, particularly in FIG. 2C, that the resulting torque ratio I_T can always lie between limits for the specific torque ratios of the individual gear steps or respectively selected gears, to be precise between $I\_T_1$ and $I\_T_2$ for the region I or between $I\_T_2$ and $I\_T_3$ for the region II or between $I\_T_3$ and $I\_T_4$ for the region III. The "hatched region" in FIG. 2C shows, here, the possible setting of the resulting torque ratio I_T.

The method is therefore applied in such a way that, in a transmission, at least two different gear steps are selected in different part transmissions, each gear step being assigned at least one clutch and the clutches being activated correspondingly. In this case, however, the clutches are activated or will be activated in such a way that the clutches simultaneously transfer specific torques in each case and in this case a resulting torque ratio between the drive shaft and the output shaft of the transmission, preferably of the double clutch transmission, is implemented continuously. The word "continuously" in this case means a torque ratio which does not break away, but is continuously implemented appropriately over the corresponding period of time of the actuation of the clutches, preferably leading to high driving comfort.

We claim:

1. A method for actuating at least two clutches transmitting torque in parallel in a drive train of a motor vehicle and having in each case different following fixed rotational speed ratios as gear steps between a drive shaft and an output shaft, which comprises the steps of:

during an acceleration operation of the motor vehicle, activating the clutches to transfer torques simultaneously and a resulting torque ratio between the drive shaft and the output shaft being implemented continuously, wherein:

if the acceleration operation is a starting operation where the motor vehicle accelerates from a standstill, setting a first rotational speed of the drive shaft higher during the entire acceleration operation than a respective second rotational speed of a respective transmission input shaft of a respective part drive train on a secondary side of a respective clutch of the two clutches; and if the acceleration operation starts while the motor vehicle is in motion, setting the first rotational speed of the drive shaft to be higher than or equal to the respective second rotational speed of the respective transmission input shaft of the respective part drive train on the secondary side of the respective clutch.

2. The method according to claim 1, which further comprises performing the starting operation with a constant engine torque.

3. The method according to claim 1, wherein a period of time provided for applying the method has a time span of at least 300 ins.

4. The method according to claim 1, which further comprises implementing an activation of each of the two clutches with an aid of a control unit.

5. The method according to claim 1, which further comprises:
performing an activation of each of the two clutches using a characteristic curve; and
calculating the characteristic curve taking into account current driving parameters.

6. The method according to claim 4, which further comprises implementing a common control of engine torque and of the resulting torque ratio with an aid of the control unit.

7. The method according to claim 1, which further comprises setting the resulting torque ratio between the drive shaft and the output shaft to lie between a torque ratio of a first part drive train of the drive train and a torque ratio of a second part drive train of the drive train.

8. The method according to claim 1, which further comprises:
selecting a specific first gear step in a first part drive train of the drive train;
selecting a specific second gear step in a second part drive train of the drive train; and
coordinating an activation of the clutches such that the clutches transfer the torques simultaneously, and the resulting torque ratio between the drive shaft and the output shaft is implemented continuously.

9. The method according to claim 1, which further comprises setting the resulting torque ratio to correspond to a resulting rotational speed ratio between the drive shaft and the output shaft which can be set via the activation of the clutches with an aid of a control unit, taking into account current driving parameters.

10. The method according to claim 9, which further comprises setting the resulting torque ratio for avoiding undesirable wheel slip.

11. The method according to claim 1, which further comprises during a predetermined time span of the acceleration operation, maintaining the an output torque provided by the output shaft at a substantially constant value.

12. The method according to claim 11, which further comprises regulating the first rotational speed of the drive shaft or of an engine without a change in the output torque taking place.

13. The method according to claim 1, which further comprises during a predetermined time span of the acceleration operation, maintaining the first rotational speed of the drive shaft or of an engine at a substantially constant value.

14. The method according to claim 13, which further comprises regulating the output torque without a change in the first rotational speed of the drive shaft or of the engine taking place.

15. The method according to claim 14, which further comprises:
determining a varying wheel torque at at least one wheel of the motor vehicle using a sensor assembly in a case of a constant first rotational speed of the drive shaft or of the engine and in a case of a signal from the sensor assembly representing a constant accelerator pedal position; and
adapting the wheel torque to specific external boundary conditions by changing the output torque.

16. The method according to claim 1, which further comprises:
detecting spinning driven wheels of the motor vehicle by:
comparing wheel rotational speeds of the driven wheels with wheel rotational speeds of nondriven wheels determined using an acceleration sensor; and/or
comparing a respective wheel rotational speed determined from the acceleration sensor with a reference rotational speed; in an event of a spinning wheel, reducing an output torque provided by the output shaft and also consequently a wheel torque of the spinning wheel until slip of the spinning wheel is reduced.

17. The method according to claim 16, wherein for reducing the slip of the spinning wheel, setting the two clutches such that a displacement of a torque to be transferred to a respective clutch of a part drive train with a selected higher gear step takes place.

18. The method according to claim 1, which further comprises performing the acceleration operation with a constant engine torque.

19. The method according to claim 1, wherein a period of time provided for applying the method has a time span of at least 300 mns.

20. The method according to claim 1, which further comprises implementing an activation of each of the two clutches with an aid of a control unit.

21. The method according to claim 1, which further comprises:
performing an activation of each of the two clutches using a characteristic curve; and
calculating the characteristic curve taking into account current driving parameters.

22. The method according to claim 20, which further comprises implementing a common control of engine torque and of a resulting torque ratio between the drive shaft and an output shaft with an aid of the control unit.

23. The method according to claim 1, which further comprises setting a resulting torque ratio between the drive shaft and the output shaft to lie between a torque ratio of a first part drive train of the drive train and a torque ratio of a second part drive train of the drive train.

24. The method according to claim 1, which further comprises:
selecting a specific first gear step in a first part drive train of the drive train;

selecting a specific second gear step in a second part drive train of the drive train; and coordinating an activation of the clutches such that the clutches transfer torques simultaneously, and a resulting torque ratio between the drive shaft and the output shaft is implemented continuously.

25. The method according to claim 1, which further comprises setting a resulting torque ratio between the drive shaft and the output shaft to correspond to a resulting rotational speed ratio between the drive shaft and the output shaft which can be set via the activation of the clutches with an aid of a control unit, taking into account current driving parameters.

26. The method according to claim 1, which further comprises implementing a resulting torque ratio between the drive shaft and the output shaft for assisting in avoiding undesirable wheel slip.

27. A transmission control unit for actuating two clutches transmitting torque in parallel in a drive train of a motor vehicle and having in each case different following fixed rotational speed ratios as gear steps between a drive shaft and an output shaft during an acceleration operation of the motor vehicle, the transmission control unit comprising:

a device for, during an acceleration operation of the motor vehicle, activating the clutches to transfer torques simultaneously and a resulting torque ratio between the drive shaft and the output shaft being implemented continuously, wherein:

if the acceleration operation is a starting operation where the motor vehicle accelerates from a standstill, setting a first rotational speed of the drive shaft higher during the entire acceleration operation than a respective second rotational speed of a respective transmission input shaft of a respective part drive train on a secondary side of a respective clutch of the two clutches; and if the acceleration operation starts while the motor vehicle is in motion, setting the first rotational speed of the drive shaft to be higher than or equal to the respective second rotational speed of the respective transmission input shaft of the respective part drive train on the secondary side of the respective clutch.

28. The transmission control unit according to claim 27, wherein a period of time provided for an application of the resulting torque ratio has a time span of at least 300 mns.

29. The transmission control unit according to claim 27, wherein said device is programmed to:

set a first rotational speed of the drive shaft higher during an acceleration operation than a respective second rotational speed of a respective transmission input shaft of a respective part drive train on a secondary side of a respective clutch of the two clutches if the acceleration operation is a starting operation where the motor vehicle accelerates from a standstill; and set the first rotational speed of the drive shaft to be higher than or equal to the respective second rotational speed of the respective transmission input shaft of the respective part drive train on the secondary side of the respective clutch if the acceleration operation starts while the motor vehicle is already in motion.

* * * * *